F. H. COZZENS.
AXLE MOUNTING FOR VEHICLES.
APPLICATION FILED JULY 22, 1920.

1,427,362.

Patented Aug. 29, 1922.
4 SHEETS—SHEET 1.

Fred H. Cozzens
Inventor
By his Attorneys
Kerr, Page, Cooper & Hayward

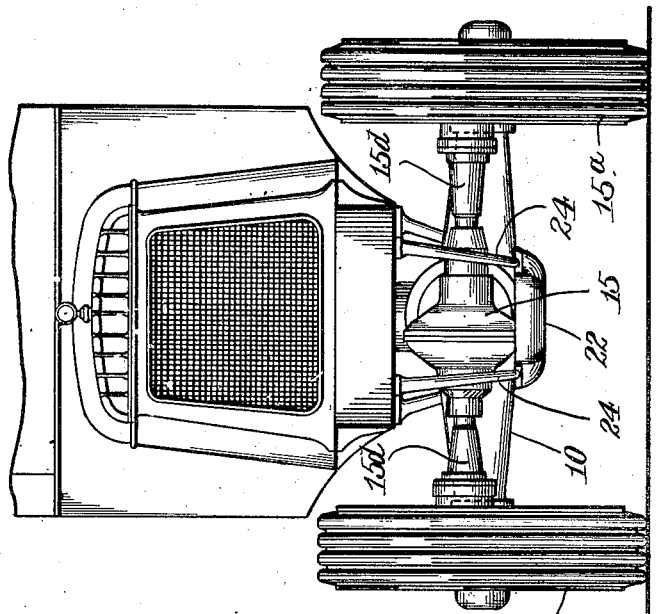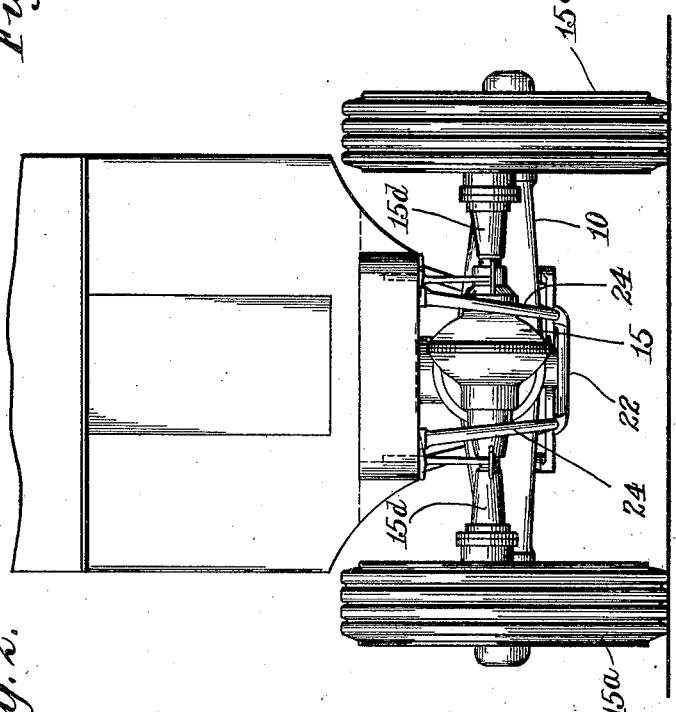

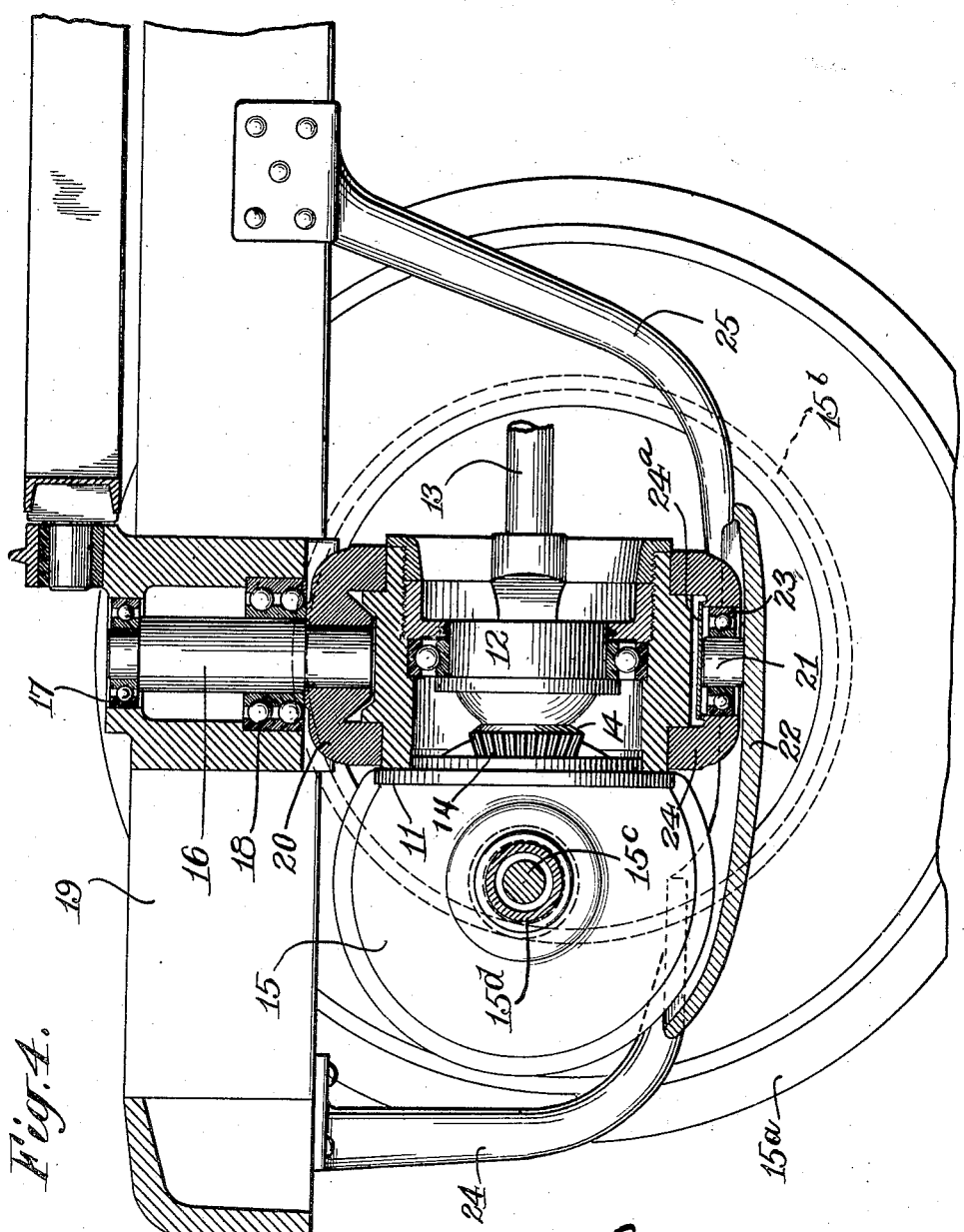

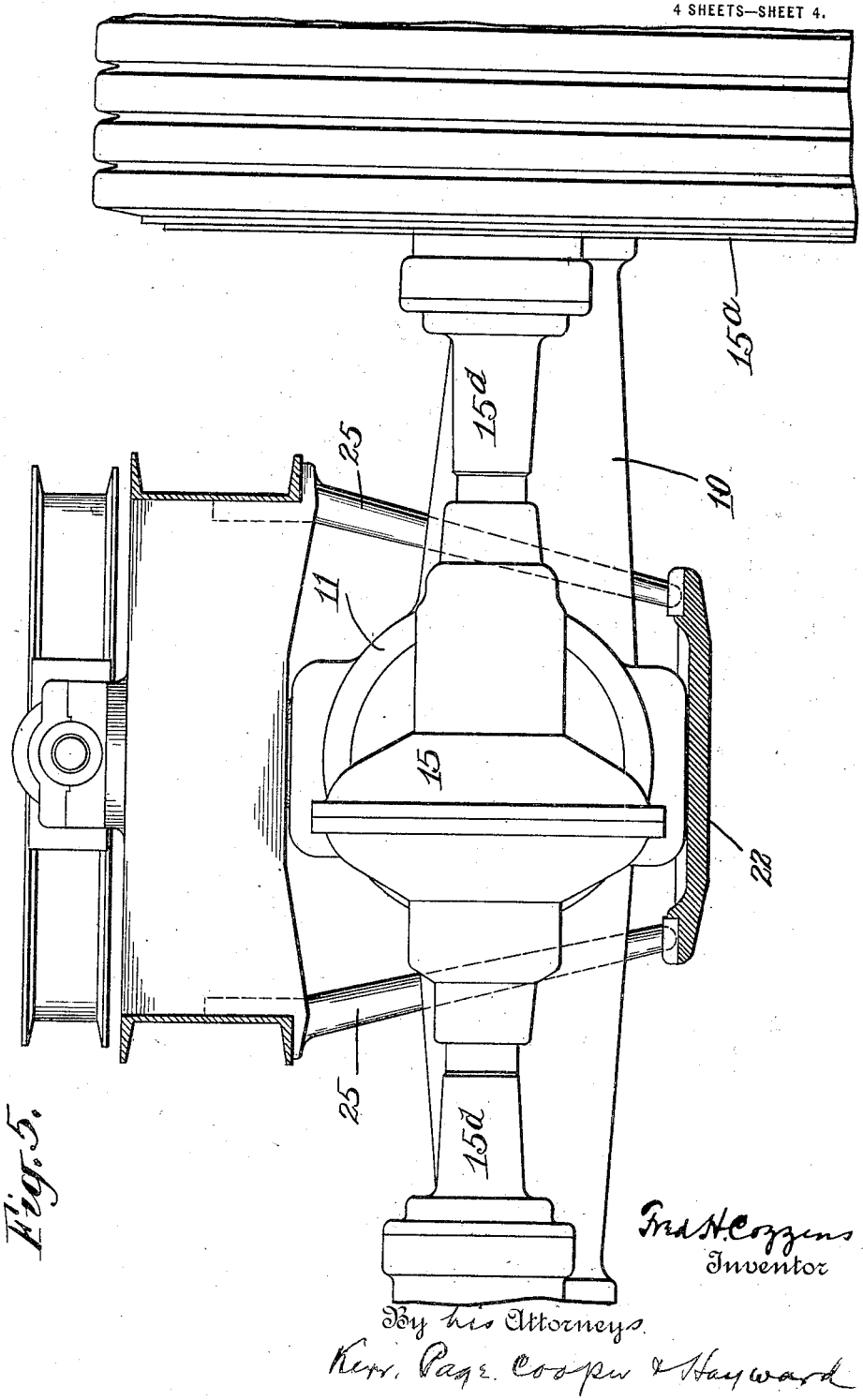

UNITED STATES PATENT OFFICE.

FRED H. COZZENS, OF NEW YORK, N. Y.

AXLE MOUNTING FOR VEHICLES.

1,427,362.

Specification of Letters Patent. Patented Aug. 29, 1922.

Application filed July 22, 1920. Serial No. 398,194.

*To all whom it may concern:*

Be it known that I, FRED H. COZZENS, a citizen of the United States, residing at New York, county and State of New York, have invented certain new and useful Improvements in Axle Mountings for Vehicles, of which the following is a full, clear, and exact description.

In automobile trucks and tractors of the so-called "four-wheel drive" type the usual practice to provide for steering the vehicle is to pivot the entire axle at the center thereof, as in horse-drawn vehicles, instead of pivoting the wheels separately on steering knuckles. This practice necessarily subjects the kingpin to severe bending stresses, with not infrequent breakage and consequent disablement of the machine, unless the kingpin is made abnormally large and heavy, but the possibilities in that direction are limited and hence it is not always possible to make the kingpin strong enough for the purpose. I have accordingly been led to devise my present invention, which has for its object to provide a method of pivoting the axle or axles of the vehicle such that kingpins of moderate size can be used with minimum liability of breaking or bending.

In carrying out my invention in the preferred manner, the axle is pivoted under the chassis frame by means of a kingpin extending upwardly from the axle, and under the axle I provide an auxiliary pivot. This latter, or the bearing therefor, is carried by a broad, smooth plate which is connected fore and aft to the frame by means of heavy arms. The plate thus serves not only as a carrier for the pivot or the pivot bearing, but also as a shoe to protect the axle from the inequalities of the surface on which the vehicle is moving.

The preferred form of the invention is illustrated in the accompanying drawings, in which Fig. 1 is a longitudinal section of a four-wheel drive tractor, with my improved kingpin or pivot construction embodied in both axles.

Fig. 2 is a rear and Fig. 3 a front view of the tractor.

Fig. 4 is a detail view on a larger scale, in longitudinal section.

Fig. 5 is a detail front view, with the riding plate or shoe in cross section.

Figure 1:
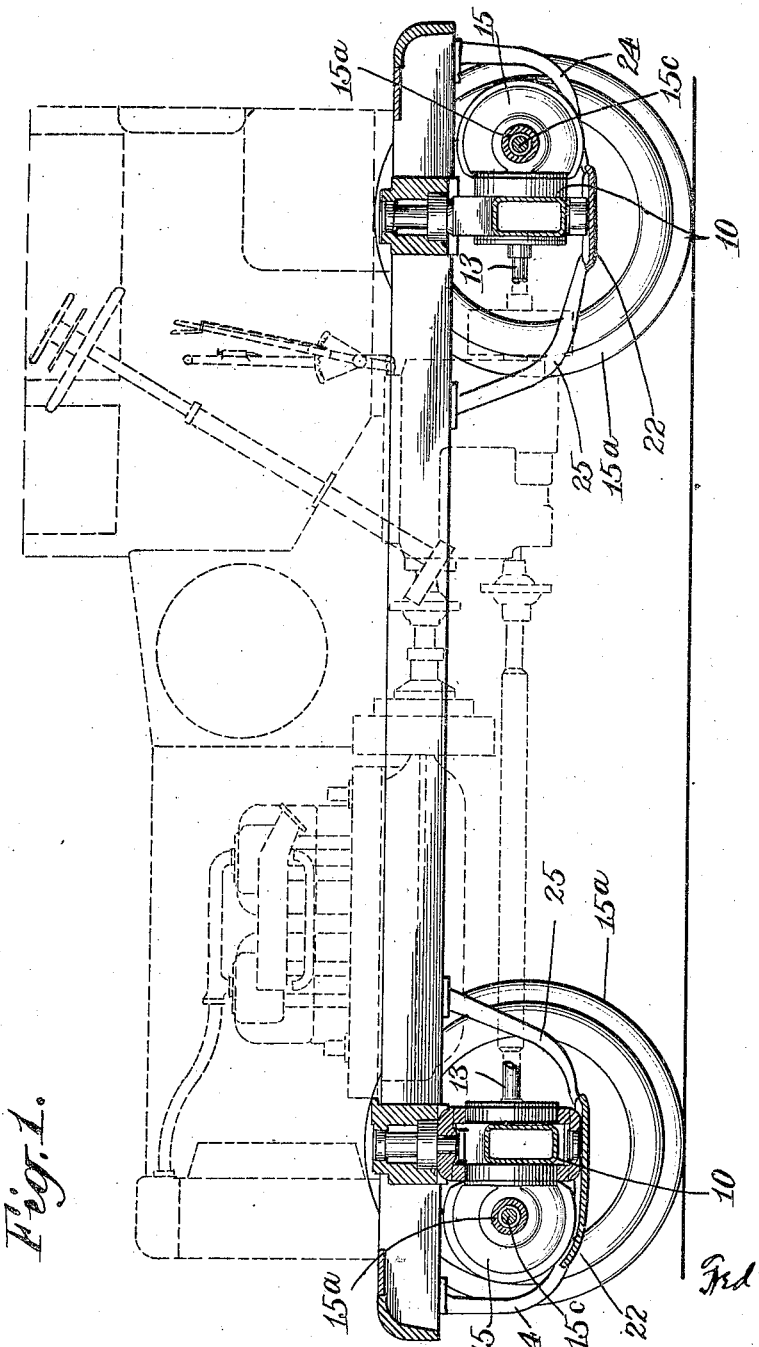

The axles 10 are each formed at the center with a housing 11 containing a universal joint 12 through which the drive of the respective propeller shaft 13 is transmitted to the pinion 14 by which, in turn, the drive is delivered to the differentials in the respective housing 15. The wheels $15^a$ are driven by internal gears $15^b$, meshing with pinions (not shown) on driving shafts $15^c$ extending from the differential housings 15 and themselves enclosed in tubular housings $15^d$. The upper kingpin 16, turning in ball bearings 17, 18, carried by the frame 19, is fitted at its lower end into a thrust-bearing 20 on the housing 11. The lower kingpin 21 is carried by and extends upwardly from the riding plate or shoe 22 and turns in a ball bearing 23 carried by a thrust bearing 24 on the underside of the housing 11. The ball bearing just mentioned is protected by a light cover plate $24^a$.

The riding shoes 22 are rounded in a flat curve, as shown, and the front shoe is inclined upwardly in the direction of forward travel so as to mount obstructions more easily. They are suspended by four arms 24, 25, two in front and two behind for each shoe, which are securely fixed to the frame 19 and spaced apart, laterally and fore-and-aft, far enough to permit the full swing of the axle.

The axle is thus pivoted at the bottom as well as at the top. In this way practically all the bending moments that otherwise would be exerted on the upper kingpin are taken by the arms on which the riding shoe is suspended. In the chassis illustrated, which is designed to give practically the maximum wheel base with a given frame length, the stresses on the arms are largely bending movements; but there are four arms for each axle, and since they can be practically of any size they can be made amply strong, with a large factor of safety. With a longer frame or a shorter wheel base the tension and compression components will be increased and the bending component decreased, as will be readily understood. The stresses on the lower kingpin are practically all shearing, and hence the possibility of failure at that point is easily eliminated by good design.

The riding shoe is designed to slide over obstructions as smoothly as possible, and effectually protects the parts above. If desired the shoe may be extended under the differential housing, as is the front shoe in Fig. 1, to protect the housing against breakage or other damage, by striking a boulder or other object.

It is to be understood that the invention is not limited to the specific construction herein illustrated and described, but can be embodied in other forms without departure from its spirit.

I claim:

1. In a vehicle, in combination, a vehicle frame, an axle, an upper thrust bearing on the upper side of the axle, a kingpin fitted to the thrust bearing and connecting the same to the frame, a lower thrust bearing on the underside of the axle, a riding shoe below the lower thrust bearing, means carried by the vehicle frame to support the riding shoe, and a kingpin connecting the lower thrust bearing and the riding shoe.

2. In a vehicle, in combination, a vehicle frame, an axle having a housing at its center, thrust bearings on the housing above and below the same, a riding shoe below the lower thrust bearing and supported from the vehicle frame, and kingpins connecting the thrust bearings to the vehicle frame and the riding shoe respectively.

3. In a vehicle, in combination, a vehicle frame, an axle having a housing at its center, driving shafts adjacent to the axle, a differential associated with the driving shafts adjacent to the axle housing, and a riding shoe suspended from the vehicle frame and underlying both said housing and said differential.

In testimony whereof I hereto affix my signature.

FRED H. COZZENS.